(12) United States Patent
Bürki et al.

(10) Patent No.: US 7,476,428 B2
(45) Date of Patent: Jan. 13, 2009

(54) PLASTIC GAS BARRIER PACKAGING LAMINATE

(75) Inventors: Monika Bürki, Villars-Mendraz (CH); Torsten Olofsson, Romont (CH)

(73) Assignee: Tetra_Laval Holdings & Finance S.A., Pully (CH)

( * ) Notice: Subject to any disclaimer, the term of this patent is extended or adjusted under 35 U.S.C. 154(b) by 331 days.

(21) Appl. No.: 11/123,122

(22) Filed: May 6, 2005

(65) Prior Publication Data

US 2005/0255268 A1 Nov. 17, 2005

Related U.S. Application Data (60) Provisional application No. 60/570,065, filed on May 12, 2004.

(30) Foreign Application Priority Data

May 10, 2004 (CH) .................................... 1215/04

(51) Int. Cl.
*B32B 27/32* (2006.01)

(52) U.S. Cl. .................... 428/35.7; 428/34.6; 428/34.7; 428/35.2; 428/35.4; 428/36.6; 428/36.7; 428/36.91; 428/336; 428/448; 428/451; 428/474.4; 428/480; 428/515; 428/520

(58) Field of Classification Search ................ 428/34.1, 428/34.4, 34.6, 34.7, 34.8, 35.2, 35.4, 35.7, 428/36.6, 36.7, 36.91, 336, 448, 451, 474.4, 428/480, 515, 520

See application file for complete search history.

(56) References Cited

U.S. PATENT DOCUMENTS

| | | | |
|---|---|---|---|
| 4,684,553 A * | 8/1987 | Sasaki et al. | 206/524.6 |
| 5,731,092 A | 3/1998 | Breant et al. | |
| 6,205,307 B1 * | 3/2001 | Nukada et al. | 399/152 |
| 6,294,640 B1 * | 9/2001 | Linstid et al. | 528/190 |

FOREIGN PATENT DOCUMENTS

| | | |
|---|---|---|
| EP | 0 385 054 B1 | 9/1990 |
| EP | 1 300 240 A1 | 4/2003 |
| WO | 99/19229 A1 | 4/1999 |
| WO | 00/30846 A1 | 6/2000 |
| WO | 02/26494 A2 | 4/2002 |

* cited by examiner

*Primary Examiner*—Rena L Dye
*Assistant Examiner*—Walter B Aughenbaugh
(74) *Attorney, Agent, or Firm*—Buchanan Ingersoll & Rooney PC (57) ABSTRACT

A gas barrier packaging laminate having durability to stress crack formation and yet a bending stiffness and good integrity between the laminate layers, includes outer layers of heat-sealable polyolefin, two polymer carrier layers each being coated with a SiOx gas barrier layer, and an intermediate polymer layer that includes at least first and second part-layers. The first part-layer has a higher stiffness than the second part-layer, and the second part-layer has higher elastomeric properties than the first part-layer. A stiff structural sandwich construction is formed by the two stiff carrier layers separated by the intermediate layer that is also shock absorbing to prevent stress-cracking of the SiOx layers. A packaging container manufactured from the packaging laminate and a method of manufacturing of the packaging laminate are also disclosed.

42 Claims, 4 Drawing Sheets

PLASTIC GAS BARRIER PACKAGING LAMINATE

CROSS-REFERENCE TO RELATED APPLICATIONS

The present application claims the benefit of U.S. Provisional Patent Application No. 60/570,065, filed in the United States on May 12, 2004, the entire contents of which are incorporated herein by reference.

TECHNICAL FIELD

The present disclosure relates to a gas barrier packaging laminate having durability to stress crack formation and yet a bending stiffness and good integrity between the laminate layers, comprising outside layers of heat-sealable olefin polymer, a first gas barrier layer of SiOx, coated onto a first polymer carrier layer and a second gas barrier layer of SiOx, coated onto a second polymer carrier layer, and an intermediate polymer layer laminated between the first and the second gas barrier coated polymer carrier layers. The disclosure also relates to a method of manufacturing the packaging laminate and to packaging containers produced from the packaging laminate.

BACKGROUND

In the discussion of the state of the art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

On the market today, there is an increasing demand for packages for beverage and liquid food of the type that are single-use disposable plastic pouches, preferably at least partly, at some portion of the package, transparent to display the contents to the consumer when exposed on the shelf, e.g., in the food store. Most commonly such packages are provided with a straw for direct drinking or a pull-tab for opening and pouring of the contents. Such packages do not have the advantage of having the dimension and grip stability of the more common paperboard packaging laminate drink packages of the Tetra Brik®-type. However, they have the image of a more positive environmental profile in many countries, with the argument that the amount of used packaging material as well as the volume of the emptied package is very small and because it may be recyclable with other similar flexible plastic items. Furthermore, the traditional Tetra Brik®-type packages have an oxygen barrier layer of aluminium foil, which in some countries is less desirable and which also makes a transparent package impossible.

In the high-speed, continuous packaging processes well known for the paperboard packages of the Tetra Brik®-type, a web of the packaging laminate is continuously formed into a tube, filled with contents and sealed off to pillow-shaped packaging containers by a simultaneous heat sealing and cuffing operation.

The pillow-shaped packaging container is then normally fold-formed into a parallellepipedic packaging container. An advantage of this continuous tube-forming, filling and sealing packaging process concept is that the web may be sterilized continuously just before tube-forming, thus providing for the possibility of an aseptic packaging process, i.e., a process wherein the liquid content to be filled as well as the packaging material itself are reduced from bacteria and the filled packaging container is produced under clean circumstances such that the filled package may be stored for a long time even at ambient temperature, without the risk of growth of microorganisms in the filled product. Another factor for long-term storage is of course also the gas barrier properties of the filled and sealed packaging container, which in turn is highly dependent on the gas barrier properties of the packaging laminate itself but also on the qualities of the seals and of the opening arrangement of the final package. Still another important advantage of the Tetra Brik®-type packaging process is, as stated above, the possibility of continuous high-speed packaging, which has considerable impact on cost efficiency. The pouch-type drink packages available today on the market, are however, typically manufactured by other non-aseptic, more complex and expensive processes of less continuous character.

In the prior art it is also known to apply gas barrier coatings of SiOx onto a substrate by means of plasma enhanced chemical vapour deposition (PECVD). The advantages with a SiOx gas barrier layer compared to other gas barrier materials are firstly that it has a positive environmental profile, secondly, that it is not affected, i.e., the barrier properties remain intact, when in contact with surrounding moisture or liquid, it is transparent and since it is applied in very thin layers, also flexible and resistant to cracking when bent or folded.

It is known from EP-A-385054 to laminate two gas barrier layers of a silicon compound, such as silicon dioxide, facing each other, by means of an intermediate adhesive layer. This document, however, is silent on the resistance to stress crack formation and the laminate layer integrity at mechanical stress and the stiffness properties of the laminate and does not describe an intermediate layer providing a shook absorbing but yet stiffening effect to the laminate. Moreover, the silicon dioxide ($SiO_2$) layers described are very different from the PECVD-coated layers of SiOx intended according to this invention.

There is thus a need for a thin, gas-tight, metalfoil-free packaging laminate having suitable properties for an aseptic, continuous high-speed packaging process similar to the Tetra Brik Aseptic® packaging process. Factors in such a process are the stiffness, elasticity and integrity of the packaging laminate. If the laminate web is too flexible and easy to displace in the high-speed tube-forming operation, the process will not be able to run safely and continuously. On the other hand, if the packaging laminate is too thick in order to obtain the required stiffness and durability, it may be difficult to manage in the fold-forming operation, and if it is not elastic and having shock absorbing properties during transport and handling, it will be prone to cracking and lose its integrity due to mechanical stress. Moreover and naturally, the cost-efficiency of the material itself will be reduced with increasing thickness. Furthermore, the packages fold-formed from the packaging laminate must have durability to stress crack formation in order to withstand handling at transport etc., which is a prerequisite that is difficult to combine with the requirements on stiffness.

The pouch-type drink packages available today on the market often have a laminated structure including a single gas barrier layer of, for example, an ethylene vinyl alcohol polymer (EVOH), and do not have the requirements on stiffness properties according to the present invention.

It is therefore an object of the present disclosure to provide a packaging laminate that alleviates the above discussed disadvantages and problems.

It is an object of the present disclosure to provide a non-foil packaging laminate, having gas barrier properties suitable for aseptic packaging and long-term storage, as well as sufficient bending stiffness and integrity and resistance to stress crack formation at mechanical stress to be suitable for continuous, high speed packaging of liquid foods by means of a continuous tube-forming process and to provide packages durable to repetitive stress during transport and handling.

It is a further object of the disclosure to provide a packaging laminate film having such required stiffness and durability but being sufficiently thin for fold-forming of the package at least one end of the package.

It is a still further object of the disclosure to provide a packaging laminate film having the above properties but also being transparent for attractive appearance of a package produced from the laminate.

The disclosure is also directed to a packaging container filled with beverage or liquid food produced from the packaging laminate of the disclosure as well as to a method of manufacturing of the laminated packaging material of the disclosure.

SUMMARY

The above-mentioned object is achieved by means of an intermediate polymer layer laminated between the first and the second gas barrier coated polymer carrier layers. The intermediate polymer layer includes at least first and second part-layers, whereof said first part-layer has a higher stiffness than said second part-layer and said second part-layer has higher elastomeric properties than said first part-layer. The whole packaging structure combines advantages of a structural sandwich construction and of an elastic shock absorber as well as a stiffness enhancer to obtain a film with good bending stiffness and keeping its integrity in aggressive transport conditions.

The facings of a sandwich panel, here represented by the two polymer carrier layer films, act similarly to the flanges of an I-beam, resisting the bending loads and increasing the bending stiffness of the structure, by being distanced from each other by an intermediate layer. However, unlike an I-beam structure, the lower density core in addition gives continuous support to the flanges or facings.

It has been observed, that the elastomeric property of the second pad-layer of the intermediate layer increases the resistance of the package to crack formation during cyclic loading, i.e. exposure to repeated stresses or vibrations such as might be the case during transport, by absorbing the mechanical stresses with elastic, reversible deformations.

It has also been observed that the stiffness property of the first part-layer of the intermediate layer gives an extra contribution, in addition to the sandwich effect, to the stiffness properties of the packaging laminate as a whole.

It has furthermore been observed, as a comparison, that if the intermediate layer is constituted by a single layer of a polymer of high stiffness, such as the polymer of the first part-layer disclosed herein, there is an increased risk of stress crack formation at mechanical stresses.

However, it has also been observed, for the comparison, that if a single layer of a polymer of high elastomeric properties constitutes the intermediate layer, the stability of the laminate during sealing might be impaired because the polymer of high elastomeric properties has a tendency to melt too much and escape the sealing area, i.e. the sealing window is narrowed. Also, the required thickness of such an intermediate layer adds to the costs of the laminate in an undesirable way.

In order to meet these problems, tests have been performed in which the intermediate layer is constituted by a blend of a high stiffness polymer and a polymer of high elastomeric properties (ratios 25/75, 40/60 and 60/40). However, the results showed similar failure frequencies (50 to 90%) in transport test simulations, due to stress crack formation, as in the case of an intermediate layer constituted by a single layer of a polymer of high stiffness.

The solution to the above mentioned problem and need, is thus to provide a thin, packaging laminate with good gas barrier properties by means of laminating the two polymer carrier layer films, coated with the SiOx gas barrier layers, into a construction with an intermediate, distancing layer including at least first and second part-layers, whereof said first part-layer has a higher stiffness than said second part-layer and said second part-layer has higher elastomeric properties than said first pad-layer, the taminate further having outer heat sealable layers of thermoplastic polymer.

In the best mode embodiment, the intermediate layer is comprised of three part-layers, wherein the third pad-layer is identical either to the first or the second part-layer and the three part-layers are arranged symmetrically in the intermediate layer, i.e. with the two identical part-layers on either outer side of the intermediate layer. Such a symmetric arrangement decreases risks of SiOx-cracking, curl inter alia and ensures good sealing.

Since it has also been found that it is preferable to have more polymer of high elastomeric properties than polymer of high stiffness, in the intermediate layer, the best mode embodiment of the intermediate layer is that the third part-layer is identical to the second part-layer and that they are arranged on either side of the first part-layer, all three layers preferably being of essentially the same thickness.

According to one exemplary aspect, at least 50%, preferably at least 60% by weight of said intermediate layer is constituted by layer(s) of high elastomeric properties.

Other exemplary embodiments may, however, be conceived in which the third part-layer is identical to the first part-layer and arranged such that the second part-layer is positioned between said first part-layer and said third part-layer, all three layers preferably being of essentially the same thickness.

Preferably, each pad-layer of the intermediate layer has a thickness of 5-30 µm, preferably 10-25 µm and most preferred 10-20 µm.

Preferably, the exemplary polymer carrier layers comprise polyester, polyamide or polypropylene materials and therefore have a certain degree of inherent stiffness, however, other relatively stiff polymers may also be employed for the carrier layers according to the disclosure. More preferably, they are oriented films and thus have a higher degree of crystallinity than non-oriented polymer films. The structural sandwich construction of two relatively stiff carrier layers laminated to each side of such an intermediate polymer layer comprising a thermoplastic polymer with high elastomeric properties provides for a laminate having good resistance to cracking during repeated mechanical stress and surprisingly good bending stiffness in relation to its thickness. In addition, the arrangement of the two PECVD-deposited SiOx-layers has proved to result in a much more than two-fold increased gas barrier, compared to a laminate or film containing merely one SiOx-layer. Thus, the construction having a distancing intermediate layer also acting as a buffer for penetration of gas, in particular oxygen gas, provides for surprisingly improved gas barrier properties, which prove a synergistic effect resulting from this particular construction. Thus, the laminate has excellent gas barrier properties and is both economical and easy to handle in a high speed, continuous packaging process.

In exemplary embodiments, the total thickness of the intermediate layer is from 30 to 55%, preferably from 35 to 50% of a total thickness of the packaging laminate. The intermediate layer, composed of at least a first and a second pad-layer, is the thickest individual layer of the laminate.

Preferably, the thickness of the carrier layers constitutes from about 5 to about 20, more preferably from about 5 to about 16% of the total packaging laminate. Generally, the carrier layers do not contribute to the total bending stiffness of the packaging laminate only by their mere thickness, but also by their interaction with the relatively thicker distancing intermediate layer.

Preferably, the carrier layer of oriented polymer is a premanufactured film of polyester, polyamide (PA) or polypropylene (PP), such as a cast or co-extrusion cast film or more preferably a mono- or biaxially oriented polyethyleneterephtalate (PET), polyethylenenaphtenate (PEN), polyamide (PA), polypropylene (PP) polymer film or a multilayer film comprising a substrate surface layer of such a polymer or a multilayer film comprising at least one such mono- or biaxially oriented layer.

Using premanufactured oriented polymer films as the carrier layers contributes at least some inherent bending stiffness relative to other layers in the laminate that are extrusion or coextrusion laminated, also at lower thicknesses.

A polymer of high stiffness for the first part-layer is suitably selected from the group consisting of high density polyethylene (HDPE) and polypropylene (PP).

A thermoplastic polymer with high elastomeric properties for the second part-layer is suitably selected from the group consisting of very low density polyethylene (VLDPE), ultra low density polyethylene (ULDPE), ethylene-based co-polymer or terpolymor and polyolefin-based elastomer or plastomer. More preferably, the polymer of the second pad-layer layer is a polyethylene copolymer or is VLDPE or ULDPE. A particularly well functioning example of a shock absorbing polymer is "Attane®" VLDPE from Dow. Other examples are "Exxco012" from Exxon and "Clearllex CLBO" from Polimeri.

Preferably, the polymer of the second pad-layer is a thermoplastic polymer with high elastomeric properties, which imparts to the pouch or walls of the packaging laminate flexibility enough to absorb and dampen energy of impacts, without leading to ruptures and leaking along sealing areas, e.g., the transversal top sealing of a wedge-like pouch, and the polymer of the carrier layer is an oriented polypropylene, or preferably, an oriented polyester or polyamide.

According to a most preferred exemplary embodiment, the gas barrier layers of SiOx are positioned in the laminate such that they are facing each other, with the intermediate polymer layer between them. In this way, optimal gas barrier layers may be obtained and the layers of SiOx will be protected in the best way. However, exemplary embodiments where one or both of the SiOx layers are facing outwards in the laminate structure are conceivable.

The SiOx layer is preferably deposited by PECVD technique, wherein x=1.7 to 2.0, at a thickness of from about 50 to about 530 angstrom (Å), preferably from about 80 to about 300 Å. There exist alternative methods of depositing inorganic layers, such as SiOx, onto polymer films, which however, generally result in thicker and less flexible layers of the SiOx. This in turn, due to the formation of cracks in the SiOx layer, generally results in laminates of lower quality with regard to oxygen barrier properties. It is thus preferred in some exemplary embodiments that the SiOx gas barrier layers are applied by means of the continuous method of plasma enhanced chemical vapour deposition (PECVD) of SiOx from a plasma of an organic silicon compound, such as hexadimethylsiloxane (HDMSO).

Preferably, the thickness of the carrier polymer layer is from about 7 to about 30 microns ($\mu$m), more preferably from about 8 to about 20 $\mu$m, most preferably from about 8 to about 15 $\mu$m, and according to a preferred embodiment, the two carrier polymer films have about the same or exactly the same thickness. It is known that the PECVD process works optimally with the above thickness of the carrier layer, which is also preferred from the economical point of view. In order to ensure a symmetrical and reliable behavior in the filling and packaging operation, it is preferable to employ carrier layers, i.e. the outer layers of the sandwich construction, that have about the same or exactly the same thickness, although it may be possible for certain desired properties to use carrier layers of different thickness or bending stiffness.

Preferably, the total thickness of the intermediate layer is from about 30 to about 90 $\mu$m, more preferably from about 35 to about 65 $\mu$m, most preferably from about 40 to about 65 $\mu$m and preferably, while the total thickness of the packaging laminate is from about 100 to about 180 $\mu$m, most preferably from about 100 to about 150 $\mu$m.

For the optimal shock-absorbing effect, the thickness of the intermediate layer should be from about 40 to about 65 $\mu$m, when the second part-layer comprises a polymer such as for example VLDPE or ULDPE. For other alternative polymers of the second part-layer, it may be feasible to use thicker intermediate layers such as up to 90 $\mu$m, in particular if the total thickness of the packaging laminate is desired to be from about above 150 to about 180 $\mu$m.

Thus, preferably, the thickness of the intermediate layer (15) is from 35 to 65 $\mu$m, the thickness of the polymer carrier layer (11, 12) is from 8 to 15 $\mu$m, the thickness of the outside layers of heat-sealable olefin polymer (16,17) is from 10 to 25 $\mu$m and from 18 to 30 $\mu$m, respectively, and the total thickness of the packaging laminate is from 100 to 150 $\mu$m.

More preferably, the thickness of the intermediate layer (15) is from 40 to 65 $\mu$m, the thickness of the polymer carrier layer (11, 12) is from 12 to 15 $\mu$m, the thickness of the outside layers of heat-sealable olefin polymer (16, 17) is from 10 to 25 $\mu$m and from 18 to 30 $\mu$m, respectively, and the total thickness of the packaging laminate is from 100 to 150 $\mu$m.

According to another preferred embodiment, the thickness of the intermediate layer (15) is from 40 to 65 $\mu$m, the thickness of the polymer carrier layer (11, 12) is from 8 to 12 $\mu$m, the thickness of the outside layers of heat-sealable olefin polymer (16, 17) is from 10 to 25 $\mu$m and from 18 to 30 $\mu$m, respectively, and the total thickness of the packaging laminate is from 100 to 150 $\mu$m.

Preferably, for an optimal bending stiffness and elastic properties, the ratio between the thickness of the intermediate layer and the carrier layer is from 2 to 8.5 and the ratio of the total thickness of the packaging laminate to the thickness of the intermediate layer is from 15 to 5 when the total thickness is from 100 to 150 $\mu$m, or, the ratio between the thickness of the intermediate layer and the carrier layer is from 4 to 10 and the ratio of the total thickness of the packaging laminate to the thickness of the intermediate layer is from 1.7 to 3 when the total thickness is from 150 to 180 $\mu$m.

A further preferred advantage is that such a packaging laminate may be transparent to provide packages having at least a portion that is transparent to make the filled contents visible.

According to another aspect, there is provided a packaging container filled with beverage or liquid food, preferably an aseptic packaging container, produced from the packaging laminate disclosed herein.

The disclosed exemplary packaging containers are a pouch or stand-up pouch or similar and is durable at handling and distribution and resistant to moisture and oxygen gas during long term storage, due to the high quality packaging laminate, which in turn also provides for high seal quality and excellent gas barrier properties. Further, packaging containers produced from the exemplary packaging laminate disclosed herein are durable to microwave cooking or thawing, as well as retorting.

According to a further aspect there is provided a method of manufacturing of the disclosed laminated packaging material.

BRIEF DESCRIPTION OF THE DRAWING FIGURES

Objects and advantages of the disclosed subject matter will become apparent from the following detailed description of preferred embodiments thereof in connection with the accompanying drawings in which like numerals designate like elements and in which.

DETAILED DESCRIPTION OF PREFERRED EMBODIMENTS

Figure 1A:
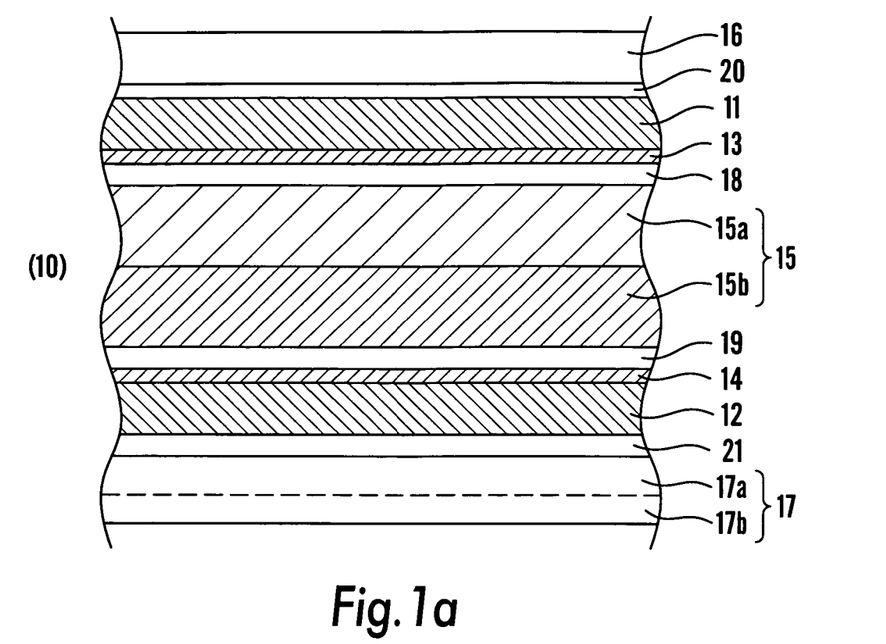
FIG. 1a is a cross-sectional view of a first embodiment of a laminated packaging material.

FIG. 1a thus shows a packaging laminate 10, comprising a first and second carrier layer 11; 12 being a film of a preferably oriented polyester, such as for example polyethyfeneterephtalate (PET, OPET or BOPET), or a film of a preferably oriented polyamide (PA), onto which are coated thin gas barrier layers of SiOx 13; 14 by means of plasma enhanced chemical vapour deposition (PECVD). The two SiOx layers are preferably directed towards the interior of the laminate, thus facing each other. Between the two carrier layers coated with gas barrier layers, is laminated an intermediate layer 15 including a first part-layer 15a of a thermoplastic, preferably polyolefin-based, polymer having a high stiffness, such as for example high density polyethylene (HDPE) or polypropylene (PP), and a second part-layer 15b of a thermoplastic, preferably polyolefin-based, polymer having high elastomeric properties, such as for example very low density polyethylene (VLDPE), ultra low density polyethylene (ULDPE), polyethylene-based copolymers or terpolymers, polyolefin-based elastomers or plastomers. The intermediate layer 15 is thicker than any of the surrounding layers in the packaging laminate, and provides as such a distancing element between the two carrier layer films of oriented polymer. The two part-layers 15a, 15b are essentially of the same thickness and may in an alternative embodiment switch place with each other.

Figure 1B:
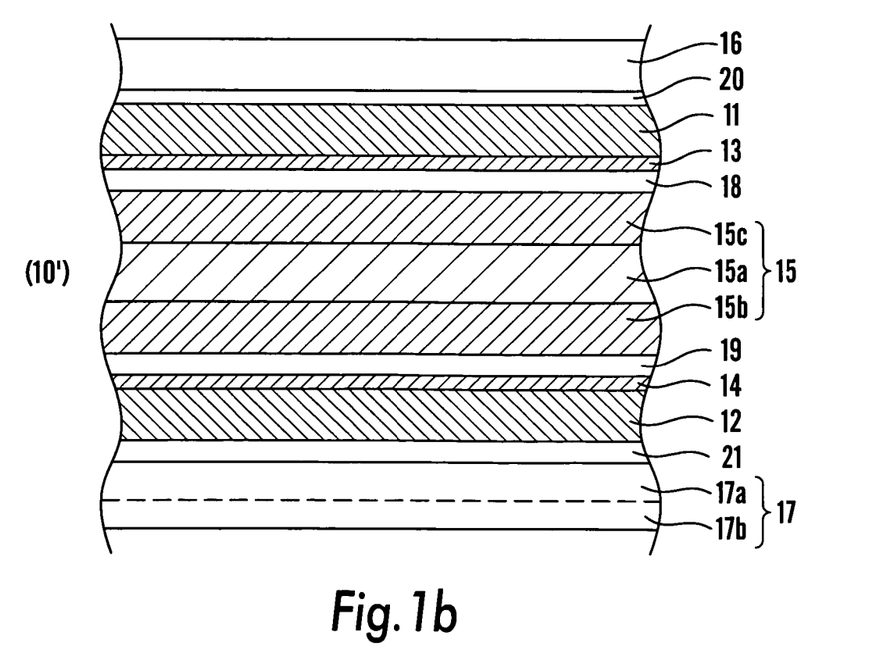
FIG. 1b is a cross-sectional view of a second embodiment of a laminated packaging material.

FIG. 1b shows a preferred packaging laminate 10' in which the intermediate layer 15, besides said first 15a and second 15b part-layers, includes a third part-layer 15c which is identical to said second part-layer 15b. The first part layer 15a is arranged in-between the second 15b and third 15c part layers.

Figure 1C:
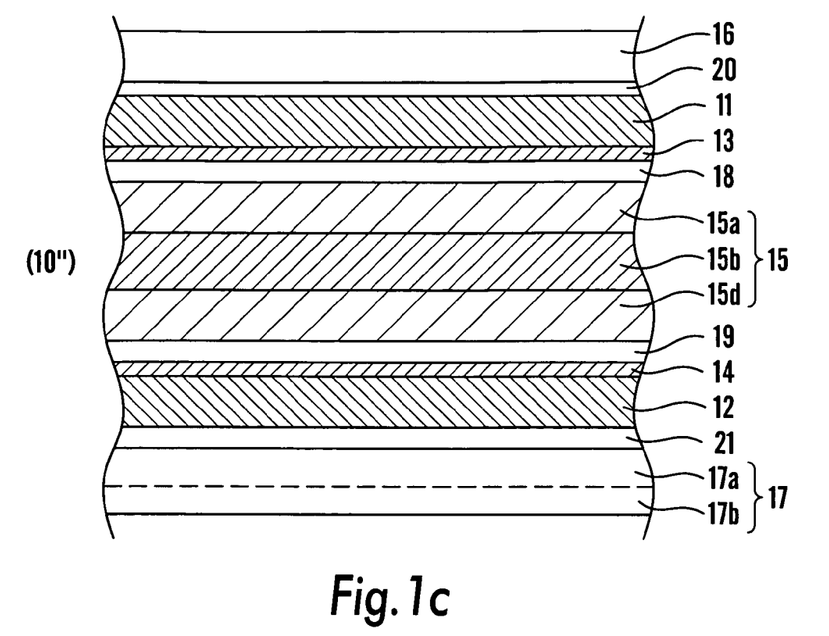
FIG. 1c is a cross-sectional view of a third embodiment of a laminated packaging material.

FIG. 1c shows yet an embodiment of a packaging laminate 10" in which the intermediate layer 15, besides said first 15a and second 15b part-layers, includes a third part-layer 15d which is identical to said first part-layer 15a. The second part-layer 15b is arranged in-between the first 15a and third 15c part layers.

In all embodiments shown in FIGS. 1a, 1b, 1c, the preferred oriented polymer films have a certain degree of inherent stiffness in that they are oriented and thus may have a relatively higher degree of crystallinity than non-oriented polymer films. The sandwich construction of two relatively stiff carrier layers laminated on each side of a thicker intermediate polymer layer provides for a laminate having surprisingly good bending stiffness in relation to its thickness. In addition, the arrangement of the two PECVD-deposited SiOx layers has proved to result in a much more than two-fold increased gas barrier, compared to a laminate or film containing merely one SiOx-layer. Thus, the arrangement of an intermediate layer also acting as a "buffer" for penetration of gas, in particular, oxygen gas, provides for surprisingly improved gas barrier properties, which indicates a synergistic effect resulting from this particular arrangement.

As an example, if two films of SiOx-coated BOPET, each having an OTR value of about 4 $cc/m^2*24$ h at 23° C. and 50% RH are laminated to each other by a thin polyolefin-based layer, the OTR value of the total construction will be about 2 $cc/m^2*24$ h at 23° C. and 50% RH. When the same films are laminated together with at least one intermediate polyolefin-based polymer layer of a thickness of about 55 $g/m^2$, the OTR value is improved to about 0.2 $cc/m^2*24$ h at 23° C. and 50% RH. Similarly, if two films of SiOx coated BOPET, each having an OTR value of about 1.6 $cc/m^2*24$ h at 23° C. and 50% RH are laminated to each other by a thin polyplefin-based layer, the OTR value of the total construction will be about 0.8 $cc/m^2*24$ h at 23° C. and 50% RH. When the same films are laminated together with at least one intermediate polyolefin-based polymer layer of a thickness of about 55 $g/m^2$, the OTH value is improved to about 0.16 $cc/m^2*24$ h at 23° C. and 50% RH. Thus, the improvement of the gas barrier by the "buffer effect" is at least four-to five-fold the improvement from using just double gas barrier films directly laminated to each other.

On the outside of the carrier layer 11, which will constitute the outside wall of a packaging container produced from the packaging laminate, is applied at least one layer 16 of a heat-sealable olefin polymer, preferably a low density polyethylene (LDPE) or a linear low density polyethylene (LLDPE), which include also so-called metallocene-catalyzed LLDPE's (m-LLDPE), i.e. LLDPE polymers catalyzed by means of a single site catalyst. Other examples of alternative polymers for the outside packaging wall layer may be medium high density polyethylene (MDPE) or polypropylene (PP).

On the outside of the carrier layer 12, which will constitute the inside wall of a packaging container produced from the packaging laminate, is applied at least one layer 17 of a heat-sealable olefin polymer, preferably a layer of LDPE, more preferably a layer of LLDPE and most preferably a first part-layer 17a of LDPE and a second outermost part-layer 17b of LLDPE.

The outside layers 16, 17 are applied each in a quantity of from about 10 to about 30 μm, for optimal heat sealability properties in relation to cost efficiency.

For good adhesion between the various layers of the packaging laminate, there are preferably used binder layers of adhesive polymers, tie layers and primers, known in the art. Such binder layers and primers are adapted to the specific choices of polymer in the various layers and may be selected from polyolefin's and modified polyolefins, preferably polyethylene-based polymers, such as for example LDPE and modified LDPE.

Such examples of binder layers are LPDE homo- or copolymers or graft copolymers of polyethylene, grafted with monomers comprising carboxylic or glycidyl functional groups, such as acrylic monomers or maleic anhydride (MAH) monomers, for example ethylene (meth)acrylic acid copolymer (E(M)AA), ethytene-glycidyl(meth)acrylate copolymer (EG(M)A) or MAH-grafted polyethylene (MAH-g-PE).

Preferably, for optimal adhesion in the binder layers 18;19 between the layers of SiOx 13:14 and the intermediate polyolefin layer 15, there is used a polyethylene base polymer graft modified by an unsaturated alkoxysilane compound, such as described in U.S. Pat. No. 5,731,092, herein incorporated by reference. See especially column 1, line 39 to column 3, line 21 and Examples 1 and 2.

Most preferably, the polyethylene base polymer graft modified by an unsaturated alkoxysilane compound is blended with a non-grafted polyethylene, such as preferably low density polyethylene (LDPE). Surprisingly, it has been found that the number of adhesion points between the grafted sites in the binder and the silicon oxide can be vastly increased if the grafted polyolefin is blended with a non-grafted polyolefin, i.e. the number of adhesion points increases despite less grafted sites in the binder polymer.

This most preferred embodiment is based on the insight that it is not only the number of grafted sites that affects the degree of adhesion, but also their ability to physically come in contact with the silicon oxide. It has been found that the grafting of polyolefin according to U.S. Pat. No. 5,731,092 results in a cross-linking of the polyolefin, which makes the polyolefin less flexible than the non-grafted polyolefin. Due to the impaired flexibility of the grafted polyolefin, the number of contact points between the binding layer composed of the grafted polyolefin and the silicon oxide will be less than for a binding layer solely composed of a non-grafted polyolefin of the same type. However, in a binding layer solely composed of a non-grafted polyolefin, the adhesion in an individual adhesion point of the plurality of adhesion points will not be as good as in an individual adhesion point of a binding layer composed solely of a grafted polyolefin.

The preferred embodiment in addition solves the problem related to these contradictory aspects of grafted and non-grafted polyolefin binders, by providing a binder that is a blend of a grafted polyolefin and a non-grafted polyolefin. Here, the improved flexibility that is achieved due to the presence of a non-grafted polyolefin provides for an increased number of adhesion points, white the grafted polyolefin provides for improved adhesion in those points, all in all resulting in adhesion properties that are better than the adhesion properties of a grafted polyolefin binder per se and a non-grafted polyolefin in binder per se.

Whenever binder layers are used between the intermediate layer and the SiOx layers, the thickness referred to as the total thickness of the intermediate layer also includes the thicknesses of such binder layers.

Any of the above discussed polymers may also be used in optional binder layers 20; 21 between the outer heat-sealable polyolefin layers 16;17 and the polymer carrier layers 11; 12.

Figure 2:
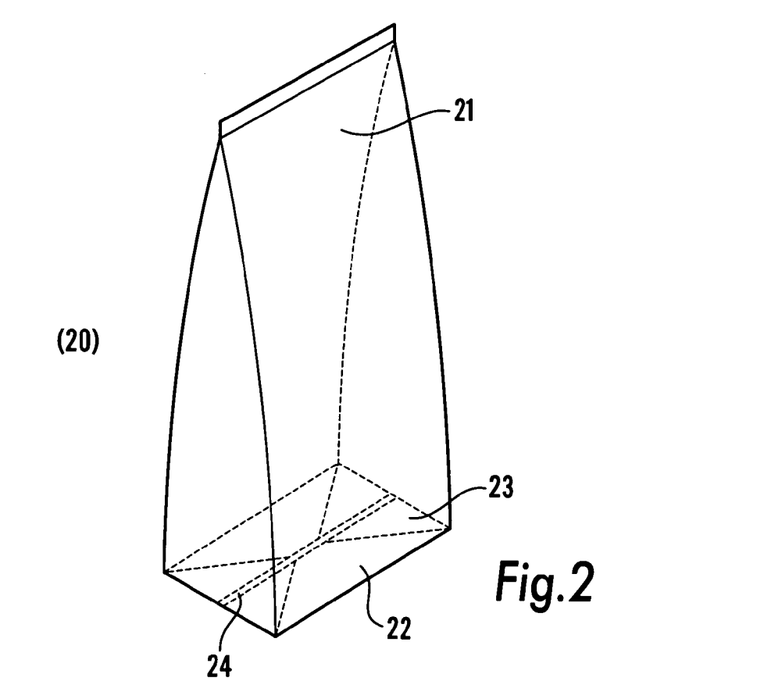
FIG. 2 shows a preferred example of a packaging container produced from the packaging laminate.

FIG. 2 shows a preferred example of a packaging container 20 produced from a packaging laminate 10,10' or 10". The packaging container is particularly suitable for small beverage packages for direct use by means of a drinking straw or the like. Typically, such a package has a volume of about 330 ml or less, preferably from about 100 to about 250 ml, for example about 125 ml, 200 ml or about 250 ml. It may be a pouch of any configuration, but is preferably shaped as a wedge 21, such that it is easy to handle and dimensionally stable when put on a shelf in the food store or on a table or the like. In order to obtain such a "wedge-shape", the bottom part 22 of the package is fold formed such that the transversal heat seal 24 of the bottom is hidden under the triangular corner flaps 23, which are folded and sealed against the bottom of the package. The packaging container 20 is preferably transparent.

Figure 3A:
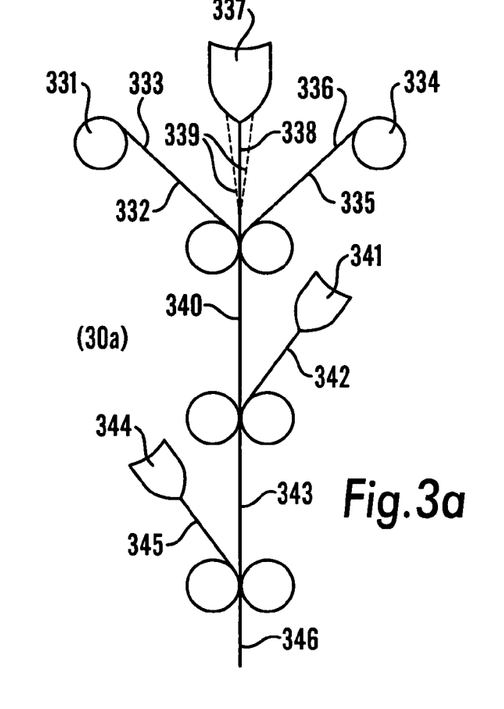
FIGS. 3a, 3b, and 3c show alternative preferred embodiments of methods of manufacturing of the packaging laminate.

FIG. 3a shows a preferred embodiment 30a of a method of producing the packaging laminate 10', 10'. A first web 331 of a polymer carrier layer 332 coated with a SiOx gas barrier layer 333, and a second web 334 of a polymer carrier layer 335 coated with a SiOx gas barrier layer 336, are advanced towards an extrusion station 337, the two SiOx layers 333 and 336 preferably facing each other, and laminated to each other by means of co-extruding an intermediate, three-part polymer layer 338 between them and pressing the two webs 331 ,334 and the intermediate layer 338 together when passing a roller nip after the extrusion station 337. The intermediate polymer layer 338 may also be coextruded together with adjacent layers of binder polymer 339 for improved bonding to the SiOx-layers on the two webs 331 and 334. The resulting laminated web 340 is advanced to an extrusion station 341, where an outside layer of a heat-sealable polyolef in 342 is extruded onto the outside of the polymer carrier layer 335. The thus resulting web 343 is further advanced to an extrusion station 344, where an outside layer of a heat-sealable polyolefin 345 is extruded onto the outside of the polymer carrier layer 332. The resulting packaging laminate 346 will then be wound up and stored onto a reel, riot shown.

Figure 3B:
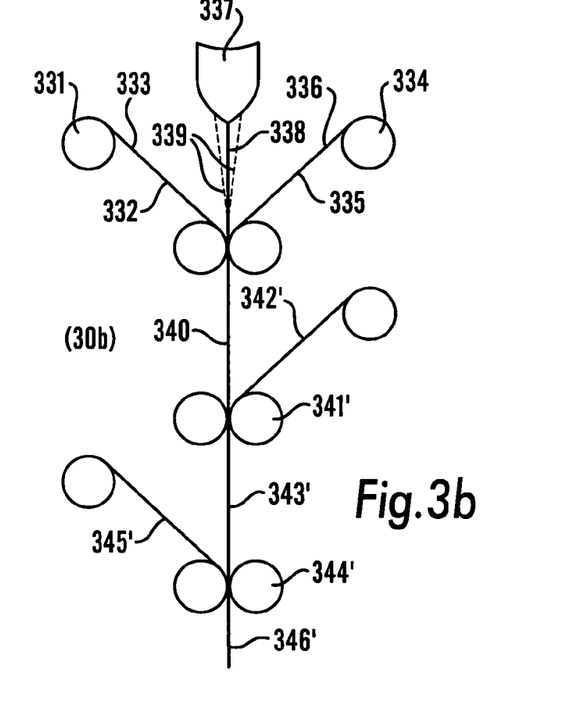

FIG. 3b shows another preferred embodiment 30b of a method of producing the packaging laminate 10', 10". A first web 331 of a polymer carrier layer 332 coated with a SiOx gas barrier layer 333, and a second web 334 of a polymer carrier layer 335 coated with a SiOx gas barrier layer 336, are advanced towards an extrusion station 337, the two SiOx layers 333 and 336 preferably facing each other, and laminated to each other by means of co-extruding an intermediate, three-part polymer layer 338 between them and pressing the two webs 331, 334 and the intermediate layer 338 together when passing a roller nip after the extrusion station 337. The intermediate polymer layer 338 may also be coextruded together with adjacent layers of binder polymer 339 for improved bonding to the SiOx layers on the two webs 331 and 334. The resulting laminated web 340 is advanced to a hot roller nip 341', where an outside layer of a premanufactured film comprising at least one layer of a heat-sealable polyolefin 342' is laminated to the outside of the polymer carrier layer 335, by means of application of heat and pressure in the hot roller nip 341'. The thus resulting web 343' is further advanced to a hot roller nip 344', where an outside layer of a heat-sealable polyolef in 345' is laminated to the outside of the polymer carrier layer 332, by application of heat and pressure in the hot roller nip 344'.

The resulting packaging laminate 346 will then be wound up and stored onto a reel, not shown.

Figure 3C:
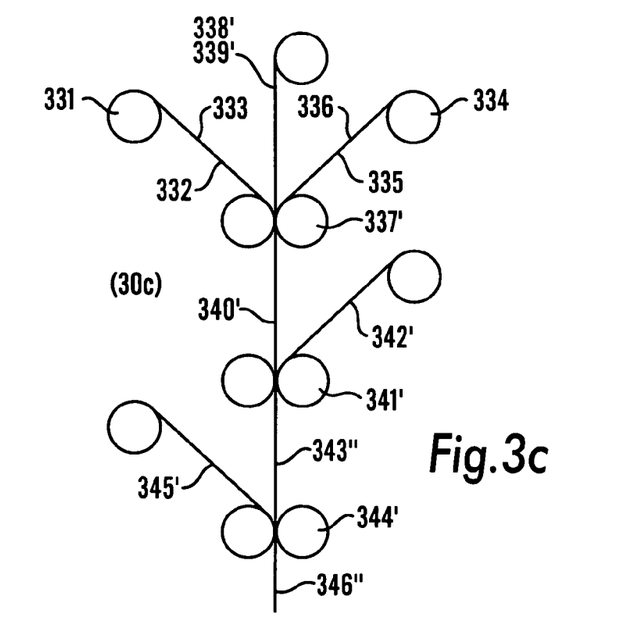

FIG. 3c shows a further preferred embodiment 30c of a method of producing the packaging laminate 10', 10". A first web 331 of a polymer carrier layer 332 coated with a SiOx gas barrier layer 333, and a second web 334 of a polymer carrier layer 335 coated with a SiOx gas barrier layer 336, are advanced towards a hot roller nip 337', the two SiOx layers 333 and 336 preferably facing each other, at the same time as a web of a pre-manufactured, co-extruded film of an intermediate, three-part polymer layer 338' is advanced between the two webs 331, 334 towards the nip 337'. The three webs are laminated to each other by application of heat and pressure when passing the hot roller nip 337'. The intermediate polymer layer 338' may be a premanufactured film having outer layers of binder polymer 339 for improved bonding to the SiOx-layers on the webs 331, 334. The resulting laminated web 340 is advanced to a hot roller nip 341', where an outside layer of a pro-manufactured film comprising at least one layer of a heat-sealable polyolefin 342' is laminated to the outside of the polymer carrier layer 335, by means of application of heat and pressure in the hot roller nip 341'. The thus resulting web 343" is further advanced to a hot roller nip 344', where an outside layer of a pre-manufactured film comprising at least one layer of a heat-sealable polyolefin 345' is laminated to the outside of the polymer carrier layer 332, by application of heat and pressure in the hot roller nip 344'. The resulting packaging laminate 346" will then be wound up and stored onto a reel, not shown.

In the method 30a above, the extrusion stations 341 and 344 may be passed in the opposite order according to an alternative preferred embodiment. In each of the methods 3Db and 3Cc above, the lamination of the outside heat-sealable polyolefin films may be carried out in the opposite order, i.e. by first laminating the premanufactured film 345' to the outer side of the polymer carrier layer 332, in the hot roller nip 344', thus resulting in a web 347. The web 347 is further advanced to a hot roller nip 341, in which the outside heat-sealable premanufactured film 342' is then laminated to the outer side of the polymer carrier layer 335, thus resulting in the packaging laminate 346 or 346".

Other combinations of hot-nip lamination and extrusion lamination are conceivable within the concepts and embodiments disclosed herein, although not represented by separate drawings. For example, a method wherein the intermediate, three-part polymer layer 338' is a pre-manufactured film to be hot-nip laminated as described in FIG. 3c, may be combined with extrusion lamination of one or both of the outer heat-sealable layers 342 and 345, such as described in connection with FIG. 3a.

According to other preferred embodiments of the methods 30a, 30b and 30c, the surface of the SiOx gas barrier layer 333, 336 is treated by a surface oxidation treatment such as corona treatment, in order to provide improved adhesion to the intermediate polymer layer 338; 338' or the binder layers 339; 339'.

According to an alternative embodiment of the method of manufacturing the packaging laminate, the various pro-manufactured webs 331, 334, 338', 342' and 345' are laminated to each other by means of primer lamination, i.e. lamination by means of coating and drying a primer or anchoring agent onto one of the webs and then laminating through a roller nip. The packaging laminate 10, 10', 10" may be provided with a printed decor layer in order to render the packaging container more attractive and informative to consumers and to protect its contents against light, which printed decor may be applied onto the SiOx layer 333 or 336, which is directed towards the outside of a package formed from the packaging laminate. Alternatively it may be applied onto the other side of the carrier layer 332 or onto the outside layer of heat-sealable polyolefin 342, 345; 342', 345'. In the latter case, the printed outside should preferably be covered by a thin, transparent protective polymer layer.

Figure 4:
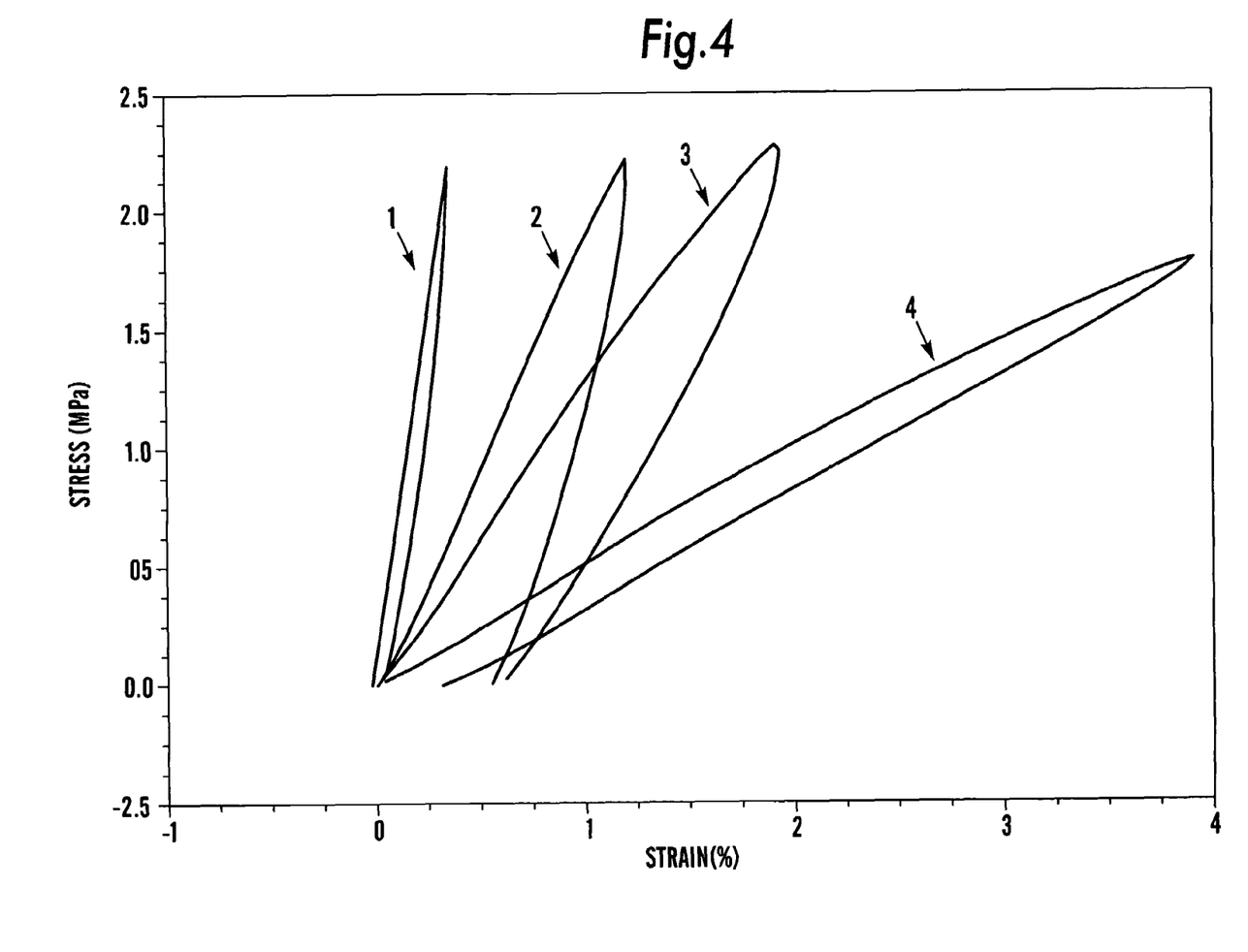
FIG. 4 shows a strain-stress graph over four different polymers or polymer blends.

FIG. 4 shows a strain-stress graph over four different polymers or polymer blends, hence giving a comparative measure of the elastomeric properties of the polymers/polymer blends.

Curve 1 represents 100% HDPE, curve 2 represents a blend of 60 % VLDPE and 40% HDPE, curve 3 represents a blend of 75% VLDPE and 25% HOPE and finally, curve 4 represents 100% VLDPE. As can be seen, the elastomeric properties increase with increasing content of VLDPE and pure VLDPE has the highest elastomeric properties.

EXAMPLE

Comparative simulation transport tests (more severe, however, than normal reality transport conditions) were carried out on packages made from laminate structures as disclosed herein having the same outermost sealing layers, two SiOx-coated carrier layers of the same thickness and type and an intermediate layer having the same total thickness in all tests. The packages were all produced in the same way. The only difference between the packages tested was the internal composition of the intermediate layer of the laminate structures. Of each type, 20 packages were simulation transport tested, i.e. placed on a shaking table and exposed to repetitive vibrations during 30 minutes. See results in Table 1. Reference examples are a laminate with an intermediate layer of 45 g/m$^2$ solely VLDPE and a laminate with an intermediate layer of 45 g/m$^2$ solely HDPE, respectively.

TABLE 1

| Intermediate layer | Machine Direction Stiffness (mNm) | Cross Direction Stiffness (mNm) | Failure Rate (of 20 packages) |
| --- | --- | --- | --- |
| VLDPE 45 g/m$^2$ Reference | 2.0 | 2.0 | 1/20 |
| HDPE 45 g/m$^2$ Reference | Up to 4.5 | 2.0 | 18/20 |
| VLDPE/HDPE/VLDPE 15/15/15 g/m$^2$ | 3.1 | 2.0 | 1/20 |
| VLDPE/HDPE/VLDPE 10/25/10 g/m$^2$ | 2.0 | 2.0 | 3/20 |
| HDPE/VLDPE/HDPE 15/15/15 g/m$^2$ | 3.3 | 2.0 | 4/20 |
| HDPE/VLDPE/HDPE 10/25/10 g/m$^2$ | 1.9 | 1.9 | 1/20 |

Leakages occurred frequently among the packages having intermediate layers of solely HDPE, while there were practically no leakages from the packages having solely VLDPE as the intermediate layer. However, the packages having solely VLDPE as the intermediate layer exhibited an undesired low stiffness. Laminates consistent with embodiments disclosed herein and with three part-layers all of the same thickness had better stiffness values and the one with most VLDPE, i.e., VLDPE/HDFENLDPE, and all three part-layers of the same thickness also had the lowest failure rate.

By way of conclusion it should be observed that the present laminates and methods which have been described above with particular reference to the accompanying figures, are not restricted to these embodiments described and shown exclusively by way of example, and that modifications and alterations obvious to a person skilled in the art are possible without departing from the inventive concept as disclosed in the appended claims.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

We claim:

1. A gas barrier packaging laminate having durability to stress crack formation and yet a bending stiffness and good integrity between laminate layers, comprising:
   outside layers of heat-sealable olefin polymer;
   a first gas barrier layer of SiOx coated onto a first polymer carrier layer, the first gas barrier layer of SiOx and the first polymer carrier layer being positioned between the outside layers of heat-sealable olefin polymer;
   a second gas barrier layer of SiOx coated onto a second polymer carrier layer, the second gas barrier layer of SiOx and the second polymer carrier layer being positioned between the outside layers of heat-sealable olefin polymer; and
   an intermediate polymer layer laminated between the first and the second gas barrier coated polymer carrier layers, wherein the intermediate polymer layer includes at least first and second part-layers, whereof said first part-layer has a higher stiffness than said second part-layer and said second part-layer has higher elastomeric properties than said first part-layer and wherein a stiffness of each of the first and second polymer carrier layers interacts with a thickness of the intermediate polymer layer as a shock absorbing, distancing layer in a structural sandwich construction, to provide the durability to stress-cracking, bending stiffness and good integrity between the layers.

2. The gas barrier packaging laminate according to claim 1, wherein the durability to stress-cracking, bending stiffness and integrity between the layers renders the packaging laminate suitable for packaging of liquid foods and drinks by a high speed, continuous process.

3. The gas barrier packaging laminate according to claim 1, wherein the thickness of the intermediate layer is from 30 to 55% of a total thickness of the packaging laminate.

4. The gas barrier packaging laminate according to claim 1, wherein each part-layer of said intermediate layer has a thickness of 5-30 µm.

5. The gas barrier packaging laminate according to claim 1, wherein said intermediate layer includes a third part-layer.

6. The gas barrier packaging laminate according to claim 5, wherein said third part-layer is identical to said first part-layer and arranged such that said second part-layer is positioned between said first part-layer and said third part-layer.

7. The gas barrier packaging laminate according to claim 5, wherein said third part-layer is identical to said second part-layer and arranged such that said first part-layer is positioned between said second pad-layer and said third part-layer.

8. The gas barrier packaging laminate according to claim 5, wherein said first, second and third part-layers are all of essentially the same thickness.

9. The gas barrier packaging laminate according to claim 1, wherein at least 50% by weight of said intermediate layer is constituted by said second part-layer.

10. The gas barrier packaging laminate according to claim 1, wherein the second part-layer is made of a material selected from the group consisting of very low density polyethylene, ultra low density polyethylene, polyethylene copolymers, polyethylene terpolymers and polyolefin-based elastomers and plastomers.

11. The gas barrier packaging laminate according to claim 1, wherein the first part-layer is made of a material selected from the group consisting of high density polyethylene (HDPE) and polypropylene (PP).

12. The gas barrier packaging laminate according to claim 1, wherein a thickness of the first polymer carrier layer and/or a thickness of the second polymer carrier layer is from 5 to 20% of a total thickness of the packaging laminate.

13. The gas barrier packaging laminate according to claim 12, wherein the thickness of the first polymer carrier layer and/or the thickness of the second polymer carrier layer is from 5 to 15% of the total thickness of the packaging laminate.

14. The gas barrier packaging laminate according to claim 1, wherein the first polymer carrier layer and/or the second polymer carrier layer is a film of polyester, polyamide or polypropylene or a multilayer film comprising a substrate surface layer of one of said polymers.

15. The gas barrier packaging laminate according to claim 1, wherein the first polymer carrier layer and/or the second polymer carrier layer is a film of a polymer selected from the group consisting of mono- or biaxially oriented polyethyleneterephtalate (PET), mono- or biaxially oriented polyethylenenaphtenate (PEN), mono- or biaxially oriented polyamide (PA) and mono- or biaxially oriented polypropylene or a multilayer film comprising at least one oriented layer of one of said polymers.

16. The gas barrier packaging laminate according to claim 1, wherein a polymer with high elastomeric properties for the second part-layer includes very low density polyethylene, a polymer of high stiffness for the first part-layer includes high density polyethylene and a polymer of the first polymer carrier layer and of the second polymer carrier layer include an oriented polyester or polyamide.

17. The gas barrier packaging laminate according to claim 1, wherein the first gas barrier layer of SiOx and the second gas barrier layer of SiOx are positioned in the laminate facing towards each other, as seen from their respective carrier layers.

18. The gas barrier packaging laminate according to claim 1, wherein the first gas barrier layer of SiOx and the second gas barrier layer of SiOx are deposited by PECVD technique at a thickness of from 50 to 500 and wherein x=1.7 to 2.0.

19. The gas barrier packaging laminate according to claim 1, wherein a thickness of the first polymer carrier layer and/or a thickness of the second polymer carrier layer is from 7 to 30 µm.

20. The gas barrier packaging laminate according to claim 1, wherein the first polymer carrier layer and the second polymer carrier layer have the same thickness.

21. The gas barrier packaging laminate according claim 1, wherein the thickness of the intermediate layer is from 30 to 90 µm.

22. The gas barrier packaging laminate according to claim 1, wherein a total thickness of the packaging laminate is from 100 to 180 µm.

23. The gas barrier packaging laminate according to claim 1, wherein the thickness of the intermediate layer is from 35 to 65 µm, a thickness of the first polymer carrier layer and/or a thickness of the second polymer carrier layer is from 8 to 15 µm, a thickness of the outside layers of heat-sealable olefin polymer is from 10 to 25 µm and from 18 to 30 µm, respectively, and a total thickness of the packaging laminate is from 100 to 150 µm.

24. The gas barrier packaging laminate according to claim 23, wherein the thickness of the intermediate layer is from 40 to 65 μm and the thickness of the first polymer carrier layer and/or the thickness of the second polymer carrier layer is from 12 to 15 μm.

25. The gas barrier packaging laminate according to claim 23, wherein the thickness of the intermediate layer is from 40 to 65 μm and the thickness of the first polymer carrier layer and/or the thickness of the second polymer carrier layer is from 8 to 12 μm.

26. The gas barrier packaging laminate according to claim 1, wherein the intermediate polymer layer is laminated to the adjacent layers of SiOx by means of a binder layer.

27. The gas barrier packaging laminate according to claim 26, wherein the binder layer comprises a blend of a graft copolymer of alkoxysilane and polyethylene with a non-grafted polyethylene.

28. The gas barrier packaging laminate according to claim 1, wherein the laminate is transparent.

29. A packaging container manufactured from the packaging laminate according to claim 1.

30. The gas barrier packaging laminate according to claim 3, wherein the thickness of the intermediate layer is from 35 to 50% of the total thickness of the packaging laminate.

31. The gas barrier packaging laminate according to claim 4, wherein the thickness of each part-layer is from 10 to 25 μm.

32. The gas barrier packaging laminate according to claim 31, wherein the thickness of each part-layer is from 10 to 20 μm.

33. The gas barrier packaging laminate according to claim 9, wherein at least 60% by weight of said intermediate layer is constituted by said layer(s) of high elastomeric properties.

34. The gas barrier packaging laminate according to claim 18, wherein the thickness is from 80 to 300 Å.

35. The gas barrier packaging laminate according to claim 19, wherein the thickness of the second polymer carrier layer is from 8 to 20 μm.

36. The gas barrier packaging laminate according to claim 35, wherein the thickness of the second polymer carrier layer is from 8 to 15 μm.

37. The gas barrier packaging laminate according to claim 21, wherein the thickness of the intermediate layer is from 35 to 65 μm.

38. The gas barrier packaging laminate according to claim 37, wherein the thickness of the intermediate layer is from 40 to 65 μm.

39. The gas barrier packaging laminate according to claim 22, wherein the total thickness of the packaging laminate is from 100 to 150 μm.

40. A gas barrier packaging laminate having durability to stress crack formation and yet a bending stiffness and good integrity between laminate layers, comprising:
first and second outside layers of heat-sealable olefin polymer, the first and second outside layers of heat-sealable olefin polymer forming outermost layers of the gas barrier packaging laminate;
an intermediate polymer layer between the first and second outside layers of heat-sealable olefin polymer, the intermediate polymer layer comprising at least a first part-layer and a second part-layer in contact with one another, the first part-layer having a higher stiffness than the second part-layer, and the second part-layer having higher elastomeric properties than the first part-layer;
a first gas barrier layer of SiOx coated onto a first polymer carrier layer, the first gas barrier layer of SiOx and the first polymer carrier layer being positioned between the first outside layer of heat-sealable olefin polymer and the first part-layer, with the first gas barrier layer of SiOx being coated onto a surface of the first polymer carrier layer facing towards the first part-layer;
a second gas barrier layer of SiOx coated onto a second polymer carrier layer, the second gas barrier layer of SiOx and the second polymer carrier layer being positioned between the second outside layer of heat-sealable olefin polymer and the second part-layer, with the second gas barrier layer of SiOx being coated onto a surface of the second polymer carrier layer facing towards the second part-layer; and
a stiffness of each of the first and second polymer carrier layers interacting with a thickness of the intermediate polymer layer as a shock absorbing, distancing layer in a structural sandwich construction to provide the durability to stress-cracking, bending stiffness and good integrity between the layers.

41. The gas barrier packaging laminate according to claim 40, wherein the second part-layer is made of a polyolefin-based thermoplastic polymer.

42. The gas barrier packaging laminate according to claim 40, wherein the intermediate layer possesses a thickness from 30 to 55% of a total thickness of the gas barrier packaging laminate.

* * * * *